United States Patent
Kudo et al.

(10) Patent No.: US 6,855,759 B2
(45) Date of Patent: Feb. 15, 2005

(54) SILICA PARTICLES SURFACE-TREATED WITH SILANE, PROCESS FOR PRODUCING THE SAME AND USES THEREOF

(75) Inventors: Muneo Kudo, Annaka (JP); Shoji Ichinohe, Takasaki (JP); Atsushi Asami, Annaka (JP); Mitsuo Asai, Annaka (JP); Kazuyuki Matsumura, Takasaki (JP); Masaki Tanaka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/284,149

(22) Filed: Oct. 31, 2002

(65) Prior Publication Data

US 2003/0134950 A1 Jul. 17, 2003

Related U.S. Application Data

(63) Continuation of application No. 09/312,054, filed on May 17, 1999, now Pat. No. 6,521,290.

(30) Foreign Application Priority Data

May 18, 1998 (JP) ............................................ 10-153564
Oct. 8, 1998 (JP) ............................................ 10-286812
Oct. 8, 1998 (JP) ............................................ 10-286813

(51) Int. Cl.$^7$ ............................................... C08K 5/24
(52) U.S. Cl. ........................ 524/261; 524/262; 427/214; 427/215; 427/220
(58) Field of Search ............................... 427/214, 215, 427/220; 524/261, 262

(56) References Cited

U.S. PATENT DOCUMENTS

| 5,013,585 A | 5/1991 | Shimizu et al. ............. 427/220 |
| 5,227,504 A | 7/1993 | Shinohara et al. .......... 556/411 |
| 5,651,921 A | 7/1997 | Kaijou |
| 5,771,431 A | 6/1998 | Mitsuhata et al. |
| 6,124,369 A | 9/2000 | Kudo et al. .................. 521/112 |
| 6,160,067 A | 12/2000 | Eriyama et al. ............. 526/279 |
| 6,166,163 A | 12/2000 | Kudo et al. .................... 528/14 |
| 6,521,290 B1 | 2/2003 | Kudo et al. .................. 427/214 |

FOREIGN PATENT DOCUMENTS

| EP | 0 342 025 A1 | 11/1989 |
| EP | 0 475 132 A1 | 3/1992 |
| EP | 0 694 576 A1 | 1/1996 |
| JP | 59-192589 | 10/1984 |
| JP | 60-224580 | 11/1985 |
| JP | 61-143176 | 6/1986 |
| JP | 62-178384 | 8/1987 |
| JP | 2-160613 | 6/1990 |
| JP | 3-197170 | 8/1991 |
| JP | 4-108606 | 4/1992 |
| JP | 5-17552 | 1/1993 |
| JP | 8-112974 | 5/1996 |
| JP | 8-231213 | 9/1996 |

*Primary Examiner*—Peter D. Mulcahy
(74) *Attorney, Agent, or Firm*—Oblon, Spivak, McClelland, Maier & Neustadt, P.C.

(57) ABSTRACT

Fine silica particles surface-treated with a silane and having primary particles having a particle diameter of from 0.01 to 5 μm, which fine silica particles fulfill the following conditions (i) and (ii), a process for their production and an organic resin composition containing such particles as a component are provided. (i) When an organic compound which is liquid at room temperature and has a dielectric constant of from 1 to 40 F/m and fine silica particles are mixed in a weight ratio of 5:1 and shaked, the fine silica particles disperse uniformly in the organic compound, and (ii) the quantity of primary particles remaining as primary particles when methanol is evaporated under heating by means of an evaporator from a dispersion prepared by dispersing the fine silica particles in methanol and thereafter the particles are held at a temperature of 100° C. for 2 hours, is in a percentage of at least 20% based on the quantity of primary particles originally present. The present fine silica particles are highly dispersible and low aggregative, and the organic resin composition containing them is useful for obtaining films having a good transparency and superior blocking resistance, slip properties and scratch resistance.

6 Claims, No Drawings

SILICA PARTICLES SURFACE-TREATED WITH SILANE, PROCESS FOR PRODUCING THE SAME AND USES THEREOF

This application is a Divisional Application of U.S. Ser. No. 09/312,054, filed on May 17, 1999, now U.S. Pat. No. 6,521,290.

BACKGROUND OF THE INVENTION

1. Field of the Invention

This invention relates to a fine silica particles treated with a silane, and more particularly to a fine silica particles having a high dispersibility and low aggregative properties, a process for their production, and an organic resin composition containing such fine silica particles.

2. Description of the Prior Art

As methods for the surface treatment of silica with silane, commonly available methods are those in which silane is made to adhere to silica particle surfaces by treatment with silicone oil and those in which silane is chemically bonded to silica particle surfaces by treatment with hexamethydisilazane.

Properties required in organic resins, in particular, organic resin films, include transparency, blocking resistance, slip properties, scratch resistance and so forth. Adding spherical fine silica particles in organic resin films is proposed and is reported to bring about an improvement in transparency of the resultant film (Japanese Pre-examination Patent Publication (Kokai) No. 4-348147).

The silica obtained by such surface treatment can be made hydrophobic appropriately, but reactive groups such as silanol groups or alkoxyl groups remaining on the silica particle surfaces may make the silica unable to be dispersed in organic solvents of various types, or may make it highly aggregative. Accordingly, it has been sought to provide fine silica particles having a high dispersibility and low aggregative properties.

Japanese Pre-examination Patent Publication (Kokai) No. 2-160613 discloses fine silica particles having a superior dispersibility, which, however, have a problem that any heating for evaporating solvents may result in a poor primary-particle retention.

When the spherical fine silica particles disclosed in Japanese Pre-examination Patent Publication (Kokai) No. 4-348147 are compounded as a component of a heat-curable or ultra-violet-curable resin composition which is liquid in a relatively low viscosity, the fine silica particles can be dispersed with difficulty in various resins and solvents because they are inorganic matter and hence have so large a specific gravity (larger than 2.0) that they may have a great difference in specific gravity from other materials (components) of the composition, and also because the fine silica particles tend to aggregate on account of the polarity or hydrogen bond of the silanol groups they have. Thus, they have a disadvantage of sedimentation with time during the storage of the composition.

SUMMARY OF THE INVENTION

Accordingly, an object of the present invention is to provide fine silica particles having a high dispersibility and low aggregative properties, and a process for their production.

Another object of the present invention is to provide an organic resin composition which is an organic resin composition which contain fine silica particles having a high dispersibility and a high stability with time, and hence can form a film having a good transparency and superior blocking resistance, slip properties and scratch resistance.

The present invention provides silane-surface-treated fine silica particles having primary particles having a particle diameter of from 0.01 to 5 $\mu$m, which fine silica particles fulfill the following conditions (i) and (ii).

(i) When an organic compound which is liquid at room temperature and has a dielectric constant of from 1 to 40 F/m and fine silica particles are mixed in a weight ratio of 5:1 and shaken, the fine silica particles disperse uniformly in the organic compound.

(ii) The quantity of primary particles remaining as primary particles when methanol is evaporated under heating by means of an evaporator from a dispersion prepared by dispersing the fine silica particles in methanol and thereafter the particles are held at a temperature of 100° C. for 2 hours, is in a percentage of at least 20% based on the quantity of primary particles originally present.

As a process for producing the above silane-surface-treated fine silica particles, the present invention also provides a process for producing silane-surface-treated fine silica particles, comprising the steps of:

(A) introducing an $R^2SiO_{3/2}$ unit (wherein $R^2$ represents a substituted or unsubstituted monovalent hydrocarbon group having 1 to 20 carbon atoms) to the surfaces of hydrophilic fine silica particles comprising an $SiO_2$ unit to obtain hydrophobic fine silica particles; and (B) introducing an $R^1_3SiO_{1/2}$ unit (wherein $R^1$'s may be the same or different and each represent a substituted or unsubstituted monovalent hydrocarbon group having 1 to 6 carbon atoms) to the surfaces of the resultant hydrophobic fine silica particles.

This process can provide highly dispersible and low aggregative hydrophobic fine silica particles having a particle diameter of from 0.01 to 5 $\mu$m.

The present invention further provides an organic resin film comprising (a) 100 parts by weight of an organic resin and (b) from 0.01 to 10 parts by weight of the above silane-surface-treated fine silica particles.

The silane-surface-treated fine silica particles obtained by the present invention have a high dispersibility and low aggregative properties any conventional ones do not have. The present fine silica particles can preferably be used to modify properties (slip properties, wear resistance, lubricity, and anti-blocking flexibility) of various rubbers and synthetic resins, to improve properties of coating materials and ink coating agents and to impart lubricating properties and water repellency to cosmetics, and also as a fluidity-providing agent for various powders such as abrasive particles for abrasives, and powdery resins.

In particular, the organic resin composition of the present invention is formed using the above highly dispersible fine silica particles as a material, and may hardly cause the settlement of fine silica particles even with time. Hence, it can form a film having a good transparency and superior blocking resistance, slip properties and scratch resistance.

DETAILED DESCRIPTION OF THE PREFERRED EMBODIMENTS

The present invention will be described below in detail.

A process for producing the fine silica particles of the present invention will be described in the order of steps.

Step (A)

In the process of the present invention, there are no particular limitations on hydrophilic fine silica particles used in the step (A) as a starting material. They may include, e.g., those obtained by a process comprising the step of subjecting a tetrafunctional silane compound represented by the general formula (I):

$$Si(OR^3)_4 \qquad (I)$$

(wherein $R^3$'s may be the same or different and each represent a monovalent hydrocarbon group having 1 to 6 carbon atoms) or a partial hydrolysis-condensation product thereof or a mixture of these, to hydrolysis and condensation in a mixed solvent of water and a hydrophilic organic solvent containing a basic substance, to obtain a hydrophilic fine silica particle mixed-solvent dispersion, and subsequently the step of converting the dispersion medium of the hydrophilic fine silica particle mixed-solvent dispersion into water to prepare an aqueous hydrophilic fine silica particle dispersion.

As specific examples of the tetrafunctional silane compound represented by the general formula (I), it may include tetraalkoxysilanes such as tetramethoxysilane, tetraethoxysilane, tetraisopropoxysilane and tetrabutoxysilane. As specific examples of the partial hydrolysis-condensation product of the tetrafunctional silane compound represented by the general formula (I), it may include methyl silicate and ethyl silicate. Any of these may be used alone or in combination of two or more.

There are no particular limitations on the hydrophilic organic solvent so long as it dissolves the compound of the general formula (I) or partial hydrolysis-condensation product and the water. It may include alcohols, cellosolves such as methyl cellosolve, ethyl cellosolve, butyl cellosolve and cellosolve acetate, ketones such as acetone and methyl ethyl ketone, and ethers such as dioxane and tetrahydrofuran. Preferred are alcohols. The alcohols may include alcohol solvents represented by the general formula (V):

$$R^6OH \qquad (V)$$

(wherein $R^6$ represents a monovalent hydrocarbon group having 1 to 6 carbon atoms). As specific examples, such alcohols may include methanol, ethanol, isopropanol and butanol. The particle diameter of fine silica particles formed increases with an increase in the number of carbon atoms of alcohols, and hence it is desirable to select the type of alcohols in accordance with the intended particle diameter of fine silica particles.

The above basic substance may include ammonia, dimethylamine and diethylamine. Any of these basic substances may be dissolved in water in a necessary quantity and thereafter the resultant aqueous solution (basic water) may be mixed with the hydrophilic organic solvent.

The water used here may preferably be in an amount of from 0.5 to 5 equivalent weight per mole of the silane compound of the general formula (I) or its partial hydrolysis-condensation product. The water and the hydrophilic organic solvent may preferably be in a ratio of from 0.5 to 10 in weight ratio. The basic substance may preferably be in an amount of from 0.01 to 1 equivalent weight per mole of the silane compound of the general formula (I) or its partial hydrolysis-condensation product.

The hydrolysis and condensation of the tetrafunctional silane compound of the general formula (I) is carried out by a known process in which the tetrafunctional silane compound of the general formula (I) is added dropwise in a mixture of the water and the hydrophilic organic solvent containing a basic substance. The dispersion medium of the hydrophilic fine silica particle mixed-solvent dispersion may be converted into water by, e.g., a process of adding water to the dispersion and evaporating the hydrophilic organic solvent (this process may optionally be repeated). The water added here may preferably be used in a 0.5-fold to 2-fold amount, and preferably about 1-fold amount, in weight ratio based on the total weight of the hydrophilic organic solvent used and alcohol formed.

The hydrophilic fine silica particles used as a starting material in the step (A) may be the mixed solvent dispersion containing hydrophilic fine silica particles, or may be an aqueous dispersion containing hydrophilic fine silica particles because the remaining alkoxyl groups are completely hydrolyzed by adding water in the hydrophilic fine silica particle mixed-solvent dispersion and evaporating the hydrophilic organic solvent to convert the dispersion medium of the dispersion into an aqueous dispersion.

Stated more specifically, the step (A) comprises, e.g., adding to an aqueous dispersion or mixed-solvent dispersion containing the hydrophilic fine silica particles a trifunctional silane compound represented by the general formula (II):

$$R^2Si(OR^4)_3 \qquad (II)$$

(wherein $R^2$ represents a substituted or unsubstituted monovalent hydrocarbon group having 1 to 20 carbon atoms, and $R^4$'s may be the same or different and each represent a monovalent hydrocarbon group having 1 to 6 carbon atoms) or a partial hydrolysis-condensation product thereof or a mixture of these, to treat the surfaces of the hydrophilic fine silica particles with it to obtain an aqueous hydrophobic fine silica particle dispersion.

As specific examples of the trifunctional silane compound represented by the general formula (II), it may include trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, trifluoropropyltrimethoxysilane and heptadecafluorodecyltrimethoxysilane. Partial hydrolysis-condensation products of these may also be used. Any of these may be used alone or in combination of two or more.

The trifunctional silane compound represented by the general formula (II) may be added in an amount of from 1 to 0.001 equivalent weight, and preferably from 0.1 to 0.01 equivalent weight, per mole of the $SiO_2$ unit of the hydrophilic fine silica particles used.

Step (B)

Stated more specifically, the step (B) comprises, e.g., the step of converting the dispersion medium of the aqueous hydrophobic fine silica particle dispersion into a ketone solvent from the water or hydrophilic organic solvent and the alcohol mixture to obtain a hydrophobic fine silica particle ketone solvent dispersion, and the step of adding to the hydrophobic fine silica particle ketone solvent dispersion a monofunctional silazane compound represented by the general formula (III):

$$R^1{}_3SiNHSiR^1{}_3 \qquad (III)$$

(wherein $R^1$'s may be the same or different and each represent a substituted or unsubstituted monovalent hydrocarbon group having 1 to 6 carbon atoms), a monofunctional silane compound represented by the general formula (IV):

$$R^1{}_3SiX \qquad (IV)$$

(wherein $R^1$'s are as defined in the general formula (III), and X represents a hydroxyl group or a hydrolyzable group) or a mixture of these to make triorganosilylation of reactive groups remaining on the surfaces of the hydrophobic fine silica particles.

The dispersion medium of the aqueous fine silica particle dispersion or mixed-solvent dispersion may be converted into a ketone solvent from the water or hydrophilic organic solvent and the alcohol mixture, by a process of adding a ketone solvent to the dispersion and evaporating the water or hydrophilic organic solvent and the alcohol mixture (this process may optionally be repeated). The ketone solvent added here may preferably be used in a 0.5-fold to 5-fold amount, and preferably about 1- to 2-fold amount, in weight ratio based on the weight of the hydrophilic fine silica particles used. As specific example of the ketone solvent used here, it may include methyl ethyl ketone, methyl isobutyl ketone and acetyl acetone. Preferred is methyl ethyl ketone.

As specific examples of the silazane compound represented by the general formula (III), it may include hexamethyldisilazane. As specific examples of the monofunctional silane compound represented by the general formula (IV), it may include monosilanol compounds such as trimethylsilanol and triethylsilanol, monochlorosilanes such as trimethylchlorosilane and triethylchlorosilane, monoalkoxysilanes such as trimethylmethoxysilane and trimethylethoxysilane, monoaminosilanes such as trimethylsilyldimethylamine and trimethylsilyldiethylamine and monoacyloxysilanes such as trimethylacetoxysilane. Any of these may be used alone or in combination of two or more.

These may each be used in an amount of from 0.1 to 0.5 equivalent weight, and preferably from 0.2 to 0.3 equivalent weight, per mole of the $SiO_2$ unit of the hydrophilic fine silica particles used.

Thus, the highly dispersible and low aggregative fine silica particles having a particle diameter of from 0.01 to 5 μm, and preferably from 0.01 to 1 μm can be obtained in which the fine silica particles comprising $SiO_2$ units have been coated with $R^2SiO_{3/2}$ units (wherein $R^2$ is as defined in the general formula (II)) and the reactive groups remaining on the surfaces of these particles have been blocked with $R^1_3SiO_{1/2}$ units (wherein $R^1$'s are as defined in the general formula (III)).

Such fine silica particles may be taken out as a powder by a conventional method, or may be obtained as a dispersion thereof to which an organic compound has been added after the reaction with silazane.

Organic Resin Composition

The organic resin composition of the present invention consists basically of (a) an organic resin and (b) the silane-surface-treated fine silica particles described above.

The component-(a) organic resin used in the organic resin composition of the present invention may be either of a thermoplastic resin and a curable resin.

The thermoplastic resin may include, e.g., polyolefins such as polypropylene and polyethylene, polyesters such as polyethylene terephthalate and polybutylene terephthalate, and polyamides such as nylon 6 and nylon 66.

The composition comprising the curable resin may include, e.g., heat-curable resin compositions such as an epoxy resin composition and an unsaturated polyester resin composition, and ultraviolet-curable resin compositions such as an epoxy acrylate resin composition and a urethane acrylate resin composition.

The component-(b) silane-surface-treated fine silica particles have been made highly hydrophobic, and hence are readily dispersible in various organic solvents and organic resins. Also, the silanols groups, which adversely affect the slip properties and blocking resistance of the resin film surface, are almost not present on the particle surfaces, and hence this brings about good results on the object and effect of the present invention. The present fine silica particles may preferably have a particle diameter of from 0.01 to 5 μm, and more preferably from 0.05 to 1 μm, in view of good slip properties and blocking resistance of the resin film surface and good transparency and also in view of the advantage that the particles may hardly settle even with time in the uncured resin composition.

Usually, the component-(b) fine silica particles may preferably be compounded in an amount of from 0.01 to 10 parts by weight, and more preferably from 0.1 to 5 parts by weight, based on 100 parts by weight of the organic resin. It is easy for those who skilled in the art to determine more preferable amount within such a range in accordance with the types of resins. Its compounding in a too small amount commonly tends to make it less effective to improve the slip properties and blocking resistance of the film, and its compounding in a too large amount tends to make the resultant resin film have a low transparency and a low strength.

In addition to the components (a) and (b) described above, stabilizers such as an antioxidant and a ultraviolet light absorber, a processing aid, a colorant, an antistatic agent, a lubricant and so forth may optionally be added and compounded in the organic resin composition of the present invention so long as the effect of the present invention is not damaged The above silane-surface-treated fine silica particles may be compounded in the organic resin by a known method, and a mixing machine such as a Henschel mixer, a V-type blender, a ribbon blender or an automatic mortar may be used. In the case when the composition has a low viscosity, the respective components in prescribed quantities may uniformly be mixed by means of a kneader mixer, a butterfly mixer or a usual mixing machine having a propeller stirrer. Thus, the organic resin composition of the present invention can be obtained.

Films may be formed from this composition by a known method, including T-die extrusion, circular die extrusion or biaxial orientation. In the case when the composition has a low viscosity, films may be formed by transferring or coating followed by hardening.

Other Uses

The silane-surface-treated fine silica particles of the present invention are also useful as an additive when polyurethane foams are produced. More specifically, the silane-surface-treated fine silica particles described above are previously added to a resin mix when polyurethane foams are produced by expanding and curing a polyurethane foam composition containing i) a resin premix containing a polyol, water as a blowing agent, a catalyst and a surface-active agent as a foam stabilizer and ii) a polyisocyanate. The silane-surface-treated fine silica particles may preferably have a particle diameter of from 0.1 to 1 μm, and may usually be added in a 0.01-fold to 20-fold amount, preferably a 0.5-fold amount, in weight ratio to the polyol. The fine silica particles of the present invention do not separate or deteriorate in the resin premix, and the resin premix can stably be stored for a long term. Thus, the resin premix need not be agitated when used, and also can be free from any damage of the desired properties such as dimensional stability. In addition, it has an advantage that it can also be used in spray blowing.

The silane-surface-treated fine silica particles of the present invention are also useful as a modifying agent of printing paper. Cellulose fibers constituting a paper base may be covered with the silane-surface-treated fine silica particles of the present invention at least partly. The printing paper thus obtained can have superior printed images, water resistance and moisture resistance. Accordingly, especially when printed using printers such as ink-jet printers and laser printers, it is unnecessary to provide any flat ink-receiving layer specially as in the paper exclusively used for such printers or to use thick paper in order to improve deformation resistance at the time of high-temperature fixing. Thus, the printing paper can be used like plain paper. To obtain such paper modified with the fine silica particles of the present invention, paper may be made from a dispersion containing cellulose fibers and the fine silica particles of the present invention, or the paper base may be coated or impregnated with such a dispersion. In this instance, the fine silica particles may preferably have an average particle diameter of from 0.01 to 0.5 μm.

EXAMPLES

The present invention will be described below in greater detail by giving Examples and Comparative Examples.

Example 1

(1) In a 3-liter glass reaction vessel having a stirrer, a dropping funnel and a thermometer, 623.7 g of methanol, 41.4 g of water and 49.8 g of 28% ammonia water were added and then mixed. The resultant solution was kept at 35° C., and 1,163.7 g of tetramethoxysilane and 418.1 g of 5.4% ammonia water were begun being simultaneously added thereto while stirring the solution, where the former and the latter were added dropwise in 6 hours and 4 hours, respectively. After the tetramethoxysilane had been added dropwise, too, the solution was continued being stirred for 0.5 hour to carry out hydrolysis, thus a suspension of fine silica particles was obtained. An ester adapter and a cooling pipe were attached to the glass reaction vessel, and the dispersion was heated to 60 to 70° C. to evaporate 649 g of methanol, where 1,600 g of water was added, followed by further heating to 70 to 90° C. to evaporate 160 g of methanol, thus an aqueous suspension of fine silica particles was obtained.

(2) To this aqueous suspension, 115.8 g of methyltrimethoxysilane (0.1 equivalent weight per mole of tetramethoxysilane) and 46.6 g of 5.4% ammonia water were added dropwise at room temperature in 0.5 hour. After they had been added dropwise, too, the dispersion was stirred for 12 hours to treat the fine silica particle surfaces.

(3) To the dispersion thus obtained, 1,000 g of methyl isobutyl ketone was added, followed by heating to 80 to 110° C. to evaporate 1,336 g of methanol water in 11 hours. To the resultant dispersion, 357.6 g of hexamethyldisilazane was added at room temperature, which was then heated to 120° C. to carry out reaction for 3 hours to effect trimethylsilylation of the fine silica particles. Thereafter, the solvent was evaporated under reduced pressure to obtain 477 g of silane-surface-treated fine silica particles The silane-surface-treated fine silica particles thus obtained were tested in the following way.

Dispersibility Test:

The fine silica particles are added to an organic compound which is liquid at room temperature, in a weight ratio of 5:1, which are then shaken for 30 minutes by means of a shaker to mix them, and thereafter the state of dispersion is visually observed. An instance where the fine silica particles stand dispersed in their entirety and the whole is uniformly in the state of a slurry is evaluated as "○"; an instance where the fine silica p articles stand wetted with the organic compound in their entirety, but not dispersed in the oragnic compound partly and non-uniform, as "Δ"; and an instance where the fine silica particles stand not wetted with the organic compound and the both do not mix, as "x". The results are shown in Table 3.

Aggregation Accelerating Test:

(1) The fine silica particles are added to methanol in a weight ratio of 5:1, which are then shaken for 30 minutes by means of a shaker. Particle size distribution of the fine silica particles thus treated is measured with a laser diffraction scattering type particle size distribution analyzer (LA910, manufactured by Horiba Seisakusho).

(2) Next, from the fine-particle dispersion obtained in (1), the methanol is evaporated under heating, by means of an evaporator, and the particles are held at a temperature of 100° C. for 2 hours. The fine silica particles thus treated are added in methanol, and then shaken for 30 minutes by means of a shaker. Thereafter, their particle size distribution is measured in the same manner as the above.

Percentage of particles remaining as primary particles is determined on the basis of the particle size distribution measured in (1). Primary particle diameter is beforehand ascertained by electron-microscopic observation. The results are shown in Table 3.

Silicone Viscosity Test:

Viscosity of a sample obtained by adding and dispersing 10 g of fine silica particles in 190 g of dimethylsilicone oil (viscosity: 1,000 cSt/25° C.) is measured with a BM-type rotational viscometer. The viscosity is measured at a rotational speed of 60 rpm. The results are shown in Table 3.

Fluidity Test:

To 100 g of a pulverized product (particle diameter: 5 to 20 μm) of a styrene-acrylate 70:30 copolymer having a melting point of 120° C., 1 g of fine silica particles are added to examine the fluidity of the copolymer pulverized product. The results are shown in Table 3.

Examples 2 to 7

Silane-surface-treated fine silica particles were obtained in the same manner as in Example 1 except that the hydrolysis temperature, the amount of water added, the manner of adding 5.4% ammonia water dropwise and its amount, the manner of adding methyltrimethoxysilane dropwise and its amount and the amount of methyl isobutyl ketone were changed as shown in Table 1. In Example 5, the evaporation of methanol was not operated.

The fine silica particles thus obtained were tested in the same manner as in Example 1. The results are shown in Table 3.

Comparative Example 1

Hydrophobic fine silica particles were tried being produced in the same manner as in Example 1 except that the step of treating fine silica particles with methyltrimethoxysilane and 5.4% ammonia water was omitted. As a result, the dispersion of fine silica particles solidified at the time of the evaporation of water.

Comparative Example 2

Silane-surface-treated fine silica particles were obtained in the same manner as in Example 1 except that the step of trimethylsilylation of fine silica particles with use of hexamethyldisilazane was omitted.

Comparative Example 3

Silane-surface-treated fine silica particles were obtained in the same manner as in Example 1 except that the water used therein was replaced with a mixture comprised of 1,000 parts by weight of water and 1,000 parts by weight of methyl isobutyl ketone.

Using the silane-surface-treated fine silica particles obtained in Comparative Examples 2 and 3, the dispersibility test, aggregation accelerating test, silicone viscosity test and fluidity test were made in the same manner as in Example 1 to obtain the results as shown in Table 4.

Comparative Examples 4 to 7

Using commercially available silane-surface-treated fine silica particles, the tests were made in the same manner as in Example 1 to obtain the results as shown in Table 4.

TABLE 1

| | | Example | | | | | | |
|---|---|---|---|---|---|---|---|---|
| | | 1 | 2 | 3 | 4 | 5 | 6 | 7 |
| Hydrolysis temperature (° C.) | | 35 | 35 | 35 | 35 | 35 | 20 | 45 |
| Amount of water added | | 1600 | 1600 | 1200 | 1200 | 0 | 1200 | 1200 |
| Trimethylsilane reaction conditions: | 5.4% Ammonia water: | | | | | | | |
| | Manner of addition | Simul-taneous | | Pre-addition | | | | |
| | Amount | 46.6 | none | 46.6 | none | none | none | none |
| | Methyltrime-thoxysilane: | | | | | | | |
| | Manner of addition | Simul-taneous | Simul-taneous | Post-addition | Post-addition | Post-addition | Post-addition | Post-addition |
| | Amount | 8 | 115.8 | 8 | 11.6 | 11.6 | 11.6 | 11.6 |
| | Equivalent weight per mole of tetrame-thoxysilane | 0.1 | 0.1 | 0.1 | 0.01 | 0.01 | 0.01 | 0.01 |
| Amount of methyl isobutyl ketone | | 1444 | 1600 | 1600 | 1444 | 1444 | 1444 | 1444 |
| Silica particle diameter (nm) | | 87 | 88 | 124 | 115 | 226 | 339 | 13 |

TABLE 2

| | Comparative Example | |
|---|---|---|
| | 2 | 3 |
| Silica particle diameter (nm) | 273 | 197 |

TABLE 3

| | Organic compound | Dielectric constant | Example | | | | | | |
|---|---|---|---|---|---|---|---|---|---|
| | | | 1 | 2 | 3 | 4 | 5 | 6 | 7 |
| Dispersibility | Acetonitrile | 38 | ○ | ○ | ○ | ○ | ○ | ○ | ○ |
| | Methanol | 33 | ○ | ○ | ○ | ○ | ○ | ○ | ○ |
| | Ethanol | 24 | ○ | ○ | ○ | ○ | ○ | ○ | ○ |
| | MIBK | 13 | ○ | ○ | ○ | ○ | ○ | ○ | ○ |
| | THF | 7 | ○ | ○ | ○ | ○ | ○ | ○ | ○ |
| | Dioxane | 3 | ○ | ○ | ○ | ○ | ○ | ○ | ○ |
| | $D_5$ | 2.5 | ○ | ○ | ○ | ○ | ○ | ○ | ○ |
| | Toluene | 2.4 | ○ | ○ | ○ | ○ | ○ | ○ | ○ |
| | Heptane | 1.9 | ○ | ○ | ○ | ○ | ○ | ○ | ○ |
| Primary particle percentage (%) | | | 42 | 80 | 50 | 100 | 25 | 86 | 57 |
| Silicone viscosity (cP) | | | 2140 | 2370 | 2410 | 2070 | 2250 | 2380 | 2230 |
| Fluidity | | | good | good | good | good | good | good | Good |

Remarks:
MIBK: Methyl isobutyl ketone
THF: Tetrahydrofuran
$D_5$: Decamethylcyclopentasiloxane

TABLE 4

|  | Organic compound | Dielectric constant | Comparative Example | | | | | |
|---|---|---|---|---|---|---|---|---|
|  |  |  | 2 | 3 | 4 NIPSIL SS50F | 5 NIPSIL SS10 | 6 AEROSIL R972 | 7 MUSIL 130A |
| Dispersibility | Acetonitrile | 38 | X | ○ | ○ | ○ | X | X |
|  | Methanol | 33 | X | ○ | ○ | Δ | X | X |
|  | Ethanol | 24 | X | ○ | ○ | ○ | X | X |
|  | MIBK | 13 | X | ○ | ○ | ○ | X | X |
|  | THF | 7 | X | ○ | ○ | ○ | X | X |
|  | Dioxane | 3 | X | ○ | X | X | X | X |
|  | $D_5$ | 2.5 | X | ○ | Δ | X | X | X |
|  | Toluene | 2.4 | X | ○ | ○ | X | X | X |
|  | Heptane | 1.9 | X | ○ | ○ | ○ | X | X |
| Primary particle percentage (%) |  |  | — | 16 | 0 | — | — | — |
| Silicone viscosity (cP) |  |  | 4280 | 3240 | 3390 | 3370 | 3910 | 4160 |
| Fluidity |  |  | poor | Poor | poor | poor | poor | Poor |

Remarks:
NIPSIL SS50F: Trade name; available from Nippon Silica Industrial Co., Ltd.; silica obtained by treating precipitated silica particle surfaces with an organosilicon compound.
NIPSIL SS10: Trade name; available from Nippon Silica Industrial Co., Ltd.; silica obtained by treating precipitated silica particle surfaces with $(CH_3)_2SiO_{2/2}$ units.
AEROSIL R972: Trade name; available from Nippon Aerosil Co., Ltd.; silica obtained by treating fumed silica particle surfaces with $(CH_3)_2SiO_{2/2}$ units.
MUSIL 130A: Trade name; available from Shin-Etsu Chemical Co., Ltd.; silica obtained by treating fumed silica particle surfaces with $CH_3SiO_{3/2}$ units.

Example 8

In 100 parts by weight of T-die molding polypropylene resin NOBLEN FL-200 (melt flow rate: 8 g/10 min; trade name; available from Mitsui Toatsu Chemicals, Inc.), 0.5 part by weight of the silane-surface-treated fine silica particles obtained in Example 1 was compounded and uniformly mixed. The mixture obtained was extruded at 250° C. by means of a single-screw extruder of 25 mm diameter, and the extruded product was pelletized with a pelletizer. The pellets obtained were further T-die extrusion-molded at 250° C. by means of a single-screw extruder of 20 mm diameter to obtain films of 0.5 mm thick.

On the films thus obtained, the following property evaluation was made.

Transparency:

Ten sheets of film are superposed, and their total light ray transmittance is measured.

Blocking Resistance:

Two sheets of film are horizontally superposed, and are held between two glass plates on the former's top and bottom sides. A load of 100 g/cm² is applied onto the top-side glass plate, and these are left at room temperature for 24 hours. Thereafter, the top-side glass plate is taken away, and the two sheets of film standing superposed are cut in a size of 5 cm×5 cm to prepare a sample. The two sheets of film are pulled in the opposite directions at the superposed end of the sample. The force (g) necessary for peeling them is measured and is regarded as an index of blocking resistance. The smaller the force necessary for peeling is, the higher the blocking resistance is.

Slip Properties:

Coefficient of dynamic friction between the film and SBR rubber surface is measured according to ASTM D-1894.

The results are shown in Table 5.

Examples 9 to 12

Films were obtained in the same manner as in Example 8 except that the fine silica particles used and the amount thereof were changed as shown in Table 5. Their properties were evaluated similarly. The results are shown in Table 5.

TABLE 5

|  | Example | | | | |
|---|---|---|---|---|---|
|  | 8 | 9 | 10 | 11 | 12 |
| Fine silica particles | Prepared in Example 1 | Prepared in Example 4 | Prepared in Example 4 | Prepared in Example 5 | Prepared in Example 6 |
| Amount (parts by weight) | 0.3 | 0.1 | 1.0 | 0.3 | 0.3 |
| Slip properties | 0.20 | 0.23 | 0.11 | 0.19 | 0.17 |
| Blocking resistance (g) | 1.5 | 2.0 | 1.1 | 1.6 | 1.4 |
| Transparency | 88 | 91 | 82 | 84 | 86 |

Comparative Examples 8 to 14

Films were obtained in the same manner as in Example 8 except that the fine silica particles used and the amount thereof were changed as shown in Table 6. Their properties were evaluated similarly. The results are shown in Table 6. Silicon dioxide particles used in Comparative Example 14 were ADOMAFINE SO-C5 (trade name; available from Adomatech Co.; average particle diameter: 2 μm; particle size distribution: 0.1 to 5 μm)

TABLE 6

|  | Comparative Example | | | | | |
|---|---|---|---|---|---|---|
|  | 8 | 9 | 10 | 11 | 12 | 14 |
| Fine silica particles | Prepared in Comparative Example 3 | Prepared in Comparative Example 4 | Prepared in Comparative Example 5 | Prepared in Comparative Example 4 | — | Silicondioxide particles |
| Amount (parts by weight) | 0.3 | 0.3 | 0.3 | 0.009 | 0 | 1.0 |
| Slip properties | 0.23 | 0.34 | 0.36 | 0.38 | 0.41 | 0.16 |
| Blocking resistance (g) | 2.2 | 3.0 | 2.9 | 7.6 | 8.2 | 1.5 |
| Transparency | 79 | 79 | 74 | 91 | 92 | 75 |

Examples 13 to 16

Into a reaction vessel, 150 g of polytetramethylene ether glycol having a number-average molecular weight of 2,000 (available from Mitsubishi Chemical Industries Limited; trade name: PTMG-2000), 150 g of polytetramethylene ether glycol having a number-average molecular weight of 1,000 (available from Mitsubishi Chemical Industries Limited; trade name: PTMG-1000), 31.6 g of neopentyl glycol and 175.4 g of 2,4-tolylenediisocyanate were charged, and the mixture obtained was reacted for 6 hours while keeping its temperature at 60 to 70° C. The isocyanated reaction mixture thus obtained was cooled to about 40° C., followed by addition of 0.15 g of tert-butylhydroxytoluene, 0.08 g of dibutyltin laurate and 119.3 g of 2-hydroxyethyl acrylate. Thereafter, the mixture obtained was reacted for 2 hours while keeping its temperature at 60 to 70° C., to obtain a urethane acrylate oligomer. Then, 55 parts by weight of this urethane acrylate oligomer, 15 parts by weight of tricyclodecanedimethanol diacrylate (available from Mitsubishi Chemical Industries Limited; trade name: SA-1002), 10 parts by weight of bisphenol A-EO modified diacrylate (available from Toagosei Chemical Industry Co., Ltd.; trade name: M-210), 10 parts by weight of N-vinylpyrrolidone, 10 parts by weight of isopholonyl acrylate and as a photopolymerization initiator 3 parts by weight of 1-hydroxycyclohexyl phenyl ketone were mixed, thus a ultraviolet-curable urethane acrylate resin composition was prepared.

To 100 parts by weight of the ultraviolet-curable urethane acrylate resin composition thus prepared, the fine silica particles shown in Table 7 were compounded and mixed in the amount (parts by weight) shown in Table 7, and these were further kneaded twice by means of a three-roll mill so as to be uniformly mixed. The resin compositions thus obtained were each coated on a glass plate in a thickness of from 30 to 50 $\mu$m, and the coating thus formed was exposed to ultraviolet rays of 200 mJ/cm$^2$ (wavelength: 350 nm) to effect curing. Thus, cured films of 50 $\mu$m thick were obtained. On the films thus obtained, their properties were evaluated in the following way.

Evaluation of Properties

Slip Properties:

Cured films are conditioned for 24 hours at 25° C. and a relative humidity of 50%, and thereafter the coefficient of friction between films is measured according to ASTM D1894.

Blocking Resistance:

Two sheets of cured film cut in a size of 5 cm×5 cm are horizontally superposed, and are held between two glass plates on the former's top and bottom sides. A load of 100 g/cm$^2$ is applied onto the top-side glass plate, and these are left at room temperature or 24 hours. Thereafter, the film is detached from the glass plates. The two sheets of film are pulled in the opposite directions at the superposed end of the film at a force of 10 g. The extent of peel or adhesion of the film is evaluated according to the following criteria.

○: Readily peelable.

x: Standing in close adhesion.

Transparency:

Cured film of 50 $\mu$m thick is prepared in the manner as described above, and its transparency is evaluated by examining whether or not the other side is seen through the film when looked through with the naked eye.

○: Seen through.

x: Not seen through.

Sedimentation:

The resin composition before curing is put in a glass bottle, and is left at 40° C., for 30 days. Thereafter, the extent of sedimentation of fine silica particles is observe with the naked eye.

○: No sedimentation is seen.

x: Sedimentation is seen, and separation into two layers is also seen.

TABLE 7

|  | Example | | | |
|---|---|---|---|---|
|  | 13 | 14 | 15 | 16 |
| Fine silica particles | Prepared in Example 1 | Prepared in Example 1 | Prepared in Example 4 | Prepared in Example 4 |
| Amount (parts by weight) | 2 | 5 | 2 | 5 |
| Slip properties | 0.23 | 0.14 | 0.19 | 0.11 |
| Blocking resistance (g) | ○ | ○ | ○ | ○ |
| Transparency | ○ | ○ | ○ | ○ |
| Sedimentation | ○ | ○ | ○ | ○ |

Comparative Examples 15 to 18

Films were obtained in the same manner as in Examples 13 to 16 except that the fine silica particles used and the amount thereof were changed as shown in Table 8. Their properties were evaluated similarly. The results are shown in Table 8.

Silicon dioxide particles used in Comparative Example 14 were those surface-treated in the following way.

100 parts by weight of ADOMAFINE SO-C5 (trade name; available from Adomatech Co.; average particle diameter: 2 μm; particle size distribution: 0.1 to 5 μm) and 1 part by weight of iron-exchanged water were mixed by means of a mixer, and then treated by heating at 60° C. for 24 hours. The mixture thus treated was cooled to room temperature, and 2 parts by weight of hexamethyldisilazane was added thereto. Thereafter, the mixture obtained was left for 24 hours at room temperature, which was then treated by heating at 120° C. for 24 hours to obtain surface-treated silicon dioxide particles.

TABLE 8

|  | Comparative Example | | | |
|---|---|---|---|---|
|  | 15 | 16 | 17 | 18 |
| Fine silica particles | Prepared in Comparative Example 4 | — | Prepared in Example 4 | Surface-treated silicon dioxide particles |
| Amount (parts by weight) | 2 | 0 | 12 | 2 |
| Slip properties | 0.35 | 5> | 0.08 | 0.39 |
| Blocking resistance (g) | ○ | X | ○ | ○ |
| Transparency | X | ○ | X | ○ |
| Sedimentation | X | — | ○ | X |

Examples 17 to 20

To 100 parts by weight of heat-curable one-part epoxy resin (available from Asahi Denka Kogyo K.K.; trade name: ADEKAOPTON KT-970; viscosity: 7,300 cP/25° C.), the fine silica particles shown in Table 9 were compounded and mixed in the amount (parts by weight) shown in Table 9, and these were further kneaded twice by means of a three-roll mill so as to be uniformly mixed. The resin compositions thus obtained were each coated on a 0.2 mm thick aluminum sheet and a glass plate in a thickness of from 30 to 50 μm each, and the coatings thus formed were heated at 130° C. for 2 hours. Thus, cured films formed on the aluminum sheet and glass plate were obtained. On the films thus obtained, their properties were evaluated in the following way.

Slip Properties:

Cured films formed on the aluminum sheet are conditioned for 24 hours at 25° C. and a relative humidity of 50%, and thereafter the coefficient of friction between films is measured according to ASTM D1894.

Blocking Resistance:

Two sheets of cured film cut in a size of 5 cm×5 cm are horizontally superposed, and are held between two glass plates on the former's top and bottom sides. A load of 100 g/cm² is applied onto the top-side glass plate, and these are left at room temperature for 24 hours. Thereafter, the film is detached from the glass plates. The two sheets of film are pulled in the opposite directions at the superposed end of the film at a force of 10 g. The extent of peel or adhesion of the film is evaluated according to the following criteria.

○: Readily peelable.

x: Standing in close adhesion.

Transparency:

Cured film of 200 to 300 μm thick is formed on a glass plate in the same manner as that described above, and its transparency is evaluated by examining whether or not the other side is seen through the film when looked through with the naked eye.

○: Seen through.

x: Not seen through.

Sedimentation:

The resin composition before curing is put in a glass bottle, and is left at 40° C. for 30 days. Thereafter, the extent of sedimentation of fine silica particles is observe with the naked eye.

: No sedimentation is seen.

x: Sedimentation is seen, and separation into two layers is also seen.

The results are shown in Table 9.

TABLE 9

|  | Example | | | |
|---|---|---|---|---|
|  | 17 | 18 | 19 | 20 |
| Fine silica particles | Prepared in Example 1 | Prepared in Example 1 | Prepared in Example 4 | Prepared in Example 4 |
| Amount (parts by weight) | 0.1 | 0.2 | 0.1 | 0.2 |
| Slip properties | 0.18 | 0.13 | 0.13 | 0.08 |
| Blocking resistance (g) | ○ | ○ | ○ | ○ |
| Transparency | ○ | ○ | ○ | ○ |
| Sedimentation | ○ | ○ | ○ | ○ |

Comparative Examples 19 to 22

Cured films were obtained in the same manner as in Examples 17 to 20 except that the fine silica particles used and the amount thereof were changed as shown in Table 10. Their properties were evaluated similarly. The results are shown in Table 10.

Silicon dioxide particles used in Comparative Example 22 were those surface-treated in the following way.

100 parts by weight of ADOMAFINE SO-C5 (trade name; available from Adomatech Co.; average particle diameter: 2 μm; particle size distribution: 0.1 to 5 μm) and 1 part by weight of iron-exchanged water were mixed by means of a mixer, and then treated by heating at 60° C. for 24 hours. The mixture thus treated was cooled to room temperature, and 2 parts by weight of hexamethyldisilazane was added thereto. Thereafter, the mixture obtained was left for 24 hours at room temperature, which was then treated by heating at 120° C. for 24 hours to obtain surface-treated silicon dioxide particles.

TABLE 10

|  | Comparative Example | | | |
|---|---|---|---|---|
|  | 19 | 20 | 21 | 22 |
| Fine silica particles | Prepared in Comparative Example 4 | — | Prepared in Example 4 | Surface-treated silicon dioxide particles |

TABLE 10-continued

|  | Comparative Example | | | |
|---|---|---|---|---|
|  | 19 | 20 | 21 | 22 |
| Amount (parts by weight) | 0.1 | 0 | 0.009 | 0.1 |
| Slip properties | 0.38 | 0.45 | 0.41 | 0.21 |
| Blocking resistance (g) | ○ | X | X | ○ |
| Transparency | X | ○ | ○ | ○ |
| Sedimentation | X | — | ○ | X |

What is claimed is:

1. An organic resin composition comprising;
(a) 100 parts by weight of an organic resin; and (b) from 0.01 to 10 parts by weight of silane-surface-treated fine silica particles wherein said silane-surface-treated fine silica particles comprise primary particles having a particle diameter of from 0.1 to 5 $\mu$m,
and the fine silane-surface-treated silica particles are obtained by:
(A) introducing an $R^2SiO_{3/2}$ unit to the surface of a hydrophilic fine silica particle comprising an $SiO_2$ unit to form a hydrophobic fine silica particle
by adding to an aqueous dispersion medium or mixed-solvent dispersion medium comprising the hydrophilic fine silica particle, a trifunctional silane compound represented by formula (II):

$$R^2Si(OR^4)_3 \tag{II}$$

wherein $R^2$ represents a substituted or unsubstituted monovalent hydrocarbon group having 1 to 20 carbon atoms, and the $R^4$ groups may be the same or different and may each represent a monovalent hydrocarbon group having 1 to 6 carbon atoms, or a partial hydrolysis-condensation product thereof or a mixture thereof, to treat the surfaces of the hydrophilic fine silica particles and form an aqueous hydrophobic fine silica particle dispersion; and
(B) introducing an $R^1_3 SiO_{1/2}$ unit to the surface of the hydrophobic fine silica particle
by converting the dispersion medium of the aqueous hydrophobic fine silica particle dispersion into a ketone solvent to obtain a hydrophobic fine silica particle ketone solvent dispersion, and adding to the hydrophobic fine silica particle ketone solvent dispersion a monofunctional silazane compound represented by formula (III):

$$R^1_3SiNHSiR^1_3 \tag{III}$$

wherein the $R^1$ groups may be the same or different and each may represent a substituted or unsubstituted monovalent hydrocarbon group having 1 to 6 carbon atoms, a monofunctional silane compound represented by formula (IV):

$$R^1_3SiX \tag{IV}$$

wherein the $R^1$ groups are as defined in formula (III), and X represents hydroxyl group or a hydrolyzable group, or a mixture thereof to triorganosilylate the reactive groups remaining on the surface of the hydrophobic fine silica particles
wherein the fine silica particles fulfill the following conditions (i) and (ii),
(i) when an organic compound which is liquid at room temperature and has a dielectric constant of from 1 to 40 F/m and fine silane-surface-treated silica particles are mixed in a weight ratio of 5:1 and shaken, the fine silane-surface-treated silica particles disperse uniformly in the organic compound; and
(ii) the quantity of primary particles remaining as primary particles when methanol is evaporated under heating from a dispersion prepared by dispersing the fine silane-surface-treated silica particles in methanol and thereafter holding the fine silane-surface-treated silica particles at a temperature of 100° C. for 2 hours, is at least 20% based on the quantity of primary particles originally present.

2. The organic resin composition according to claim 1, wherein the organic resin is a thermoplastic resin or a curable resin.

3. The organic resin composition according to claim 1, wherein the organic resin is selected from the group consisting of a polyolefin, a polyester, nylon 6 and nylon 6,6.

4. The organic resin composition according to claim 1, wherein the organic resin is selected from the group consisting of an epoxy resin, an unsaturated polyester resin, an epoxy acrylate resin, a urethane acrylate resin and mixtures thereof.

5. The organic resin composition according to claim 1, further comprising one or more additive selected from the group consisting of an antioxidant, a UV light absorber, a processing aid, a colorant, an antistatic agent and a lubricant.

6. The organic resin composition of claim 1, wherein the silane-surface-treated fine silica particles have a particle diameter of from 0.05 to 1 $\mu$m.

* * * * *